Patented Apr. 1, 1941

2,237,265

UNITED STATES PATENT OFFICE 2,237,265

2-METHYL-ALLYL-SUBSTITUTED MALONIC ESTER

Horace A. Shonle, Indianapolis, Ind., assignor to Eli Lilly and Company, Indianapolis, Ind., a corporation of Indiana No Drawing. Application August 3, 1938, Serial No. 222,753

8 Claims. (Cl. 260—485)

It is the object of my invention to produce certain unsymmetrical di-substituted malonic esters which have as one substituent the 2-methyl-allyl group (1) 

and have a second substituent consisting of a saturated primary or secondary or cyclic aliphatic-hydrocarbon group which contains from 2 to 6 carbon atoms and which has a carbon atom that is directly attached to the methylene carbon of the malonic ester and that is attached to not more than two other carbon atoms. The second substituent is capable of considerable variation, of which the following are examples:

(a) Ethyl.
(b) n-Propyl, isopropyl.
(c) n-Butyl, isobutyl, secondary-butyl.
(d) n-Amyl, isoamyl, 1-methyl-butyl, 2-methyl-butyl, 1-ethyl-propyl.
(e) n-Hexyl, isohexyl, secondary-hexyl, 2-ethyl-butyl.
(f) Allyl.
(g) Cyclo-pentyl, cyclo-pentenyl, cyclo-hexyl, cyclo-hexenyl.

These malonic esters are useful as intermediates in the preparation of other products, notably in the preparation of corresponding unsymmetrical di-aliphatic-substituted barbituric acids and salts of those acids, which substituted barbituric compounds are of the general character set forth in my Patents Nos. 2,106,138 and 2,106,139, both granted January 18, 1938.

The unsymmetrical di-substituted malonic esters contemplated by the present invention may all be represented by the following formula:

(2) 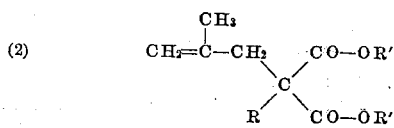

in which R represents a saturated aliphatic-hydrocarbon group which contains from 2 to 6 carbon atoms and which has a carbon atom that is directly attached to the methylene carbon of the malonic ester and that is attached to not more than two other carbon atoms, which group may also be defined as a saturated primary or secondary or cyclic aliphatic hydrocarbon group having from 2 to 6 carbon atoms; and R' represents an alkyl radical having not to exceed 3 carbon atoms, namely the methyl, ethyl, and propyl radicals, and preferably the ethyl radical.

Because of this preference for the ethyl radical, whenever I refer to a malonic ester (substituted or unsubstituted) I mean an ethyl malonate unless otherwise indicated.

I shall describe several examples of malonic esters embodying my invention, and the process of making them.

*Mono-substituted malonic ester:*

Although the invention claimed in this application contemplates no mono-substituted malonic ester, yet for completeness of disclosure, and because it is the simplest malonic ester containing the 2-methyl-allyl group and the only mono-substituted malonic ester containing it, and because it may be used in preparing many unsymmetrical di-substituted malonic esters which are within the purview of the present invention, I shall first describe the mono-2-methyl-allyl malonic ester, which has the following formula:

(3) 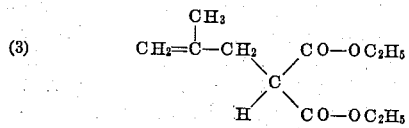

It may be prepared as follows:

1 mol of sodium is dissolved in from 10 to 12 times its weight of absolute alcohol, under a reflux condenser. 1 mol of malonic ester (ethylmalonate) is then added. Part of the alcohol that was used to dissolve the sodium may then be removed, as by vacuum distillation, and then about 1.1 mols of 2-methyl-allyl halide, such as the chloride, is gradually added. The mixture is refluxed for some hours, until it no longer shows an alkaline reaction to moist litmus paper. Then most of the alcohol remaining, whether or not some had previously been removed, is removed by vacuum distillation; which leaves an oily residue. Water is added to this residue to dissolve out the sodium halide present in it; and the oily layer, which is the desired mono-2-methyl-allyl malonic ester, is separated and dried. This is purified by fractional distillation in vacuo. When so purified, it is a colorless or pale yellow liquid; which has a boiling point of 93–94° C., uncorrected, at about 3 to 4 mm. pressure.

*Unsymmetrical di-substituted malonic esters:*

In preparing these unsymmetrical disubstituted malonic esters, with the second substituent R a hydrocarbon group within the definition given above, I may introduce either the 2-methyl-allyl group or the hydrocarbon R group first.

If the 2-methyl-allyl group is introduced first, to produce mono-2-methyl-allyl malonic ester, that malonic ester is prepared as has just been described; and then the hydrocarbon R group, forming the second substituent, is introduced as follows, desirably in a separate procedure:

1 mol of sodium is dissolved in from 10 to 12 times its weight of absolute alcohol, under a reflux condenser. 1 mol of 2-methyl-allyl malonic ester (2-methyl-allyl ethyl-malonate) is then added. Part of the alcohol that was used to dissolve the sodium may then be removed, as by vacuum distillation, and then about 1.1 mols of a halide (such as a bromide) of the desired hydrocarbon R group is gradually added. The mixture is refluxed for some hours, until it no longer shows an alkaline reaction to moist litmus paper. Most of the alcohol remaining, whether or not some had been removed, is now removed by vacuum distillation, leaving an oily residue. Water is added to that residue to dissolve out the sodium halide present in it; and the oily layer, which is the desired disubstituted R 2-methyl-allyl malonic ester, is separated and dried. This R 2-methyl-allyl malonic ester is purified by fractional distillation in vacuo, and in every instance is a colorless or pale yellow liquid.

If the hydrocarbon R group is introduced first, that may be done in the usual manner of making mono-aliphatic-substituted malonic esters, and in general in the manner similar to that described above for making mono-2-methyl-allyl malonic ester save that instead of using a 2-methyl-allyl halide a halide of the desired aliphatic R group is used.

When that mono-substituted malonic ester is obtained containing the desired aliphatic R group, the desired disubstituted malonic ester may be prepared by a method similar to the method above described of preparing the disubstituted malonic ester from the mono-2-methyl-allyl malonic ester, save that the mono-R-substituted malonic ester is used in place of the mono-2-methyl-allyl malonic ester, and a 2-methyl-allyl halide is used in place of an R halide.

Among the disubstituted malonic esters which may be prepared in these manners are the following:

*n-Propyl 2-Methyl-Allyl Malonic Ester:*

When purified by fractional distillation in vacuo, n-propyl 2-methyl-allyl malonic ester has a boiling point of 103–107° C., uncorrected, at about 3 mm. pressure. It is represented by the following formula:

(4) 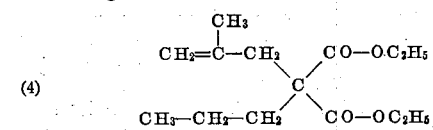

*Isoamyl 2-Methyl-Allyl Malonic Ester:*

When purified by fractional distillation in vacuo, isoamyl 2-methyl-allyl malonic ester has a boiling point of 114–117° C., uncorrected, at 2 to 3 mm. pressure. It is represented by the following formula:

(5) 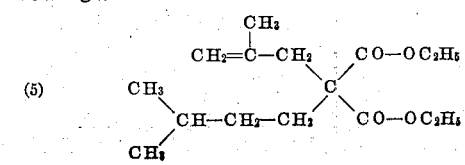

*1-Methyl-Butyl 2-Methyl-Allyl Malonic Ester:*

When purified by fractional distillation in vacuo, 1-methyl-butyl 2-methyl-allyl malonic ester has a boiling point of 140–144° C., corrected, at 8 to 9 mm. pressure. (When "corrected" temperatures are given in this specification, it is meant that the temperatures are those obtained by short-stem Anschütz thermometers, as distinguished from the "uncorrected" temperatures obtained by long-stem thermometers). It is represented by the following formula:

(6) 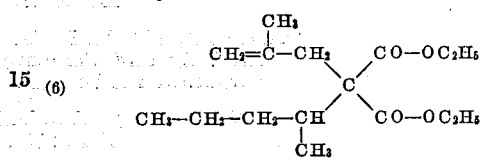

*2-Methyl-Butyl 2-Methyl-Allyl Malonic Ester:*

When purified by fractional distillation in vacuo, 2-methyl-butyl 2-methyl-allyl malonic ester has a boiling point of 135–138° C. uncorrected, at about 7 mm. pressure. It is represented by the following formula:

(7) 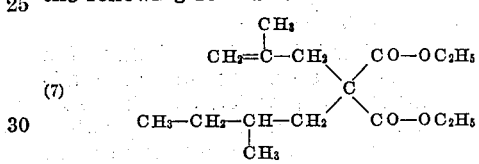

*Isopropyl 2-Methyl-Allyl Malonic Ester:*

When purified by fractional distillation in vacuo, isopropyl 2-methyl-allyl malonic ester has a boiling point of 124–127° C., corrected, at about 9 to 10 mm. pressure. It is represented by the following formula:

(8) 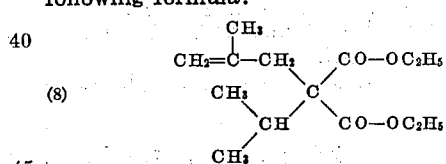

*Iso-Butyl 2-Methyl-Allyl Malonic Ester:*

When purified by fractional distillation in vacuo, iso-butyl 2-methyl-allyl malonic ester has a boiling point of 110–114° C., uncorrected, at about 1 mm. pressure. It is represented by the following formula:

(9) 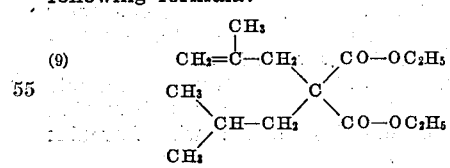

*n-Hexyl 2-Methyl-Allyl Malonic Ester:*

When purified by fractional distillation in vacuo, n-hexyl 2-methyl-allyl malonic ester has a boiling point of 122–130° C., uncorrected, at about 1 mm. pressure. It is represented by the following formula:

(10) 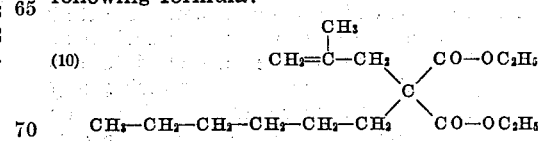

*2-Ethyl-Butyl 2-Methyl-Allyl Malonic Ester:*

When purified by fractional distillation in vacuo, 2-ethyl-butyl 2-methyl-allyl malonic ester has a boiling point of 127–133° C., corrected, at about 1 mm. pressure. It is represented by the following formula

(11) 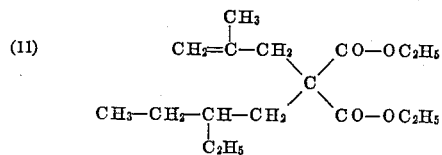

*n-Butyl 2-Methyl-Allyl Malonic Ester:*

When purified by fractional distillation in vacuo, n-butyl 2-methyl-allyl malonic ester has a boiling point of 131–132° C., corrected, at about 3 mm. pressure. It is represented by the following formula:

(12) 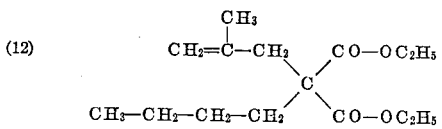

*1-Methyl-Propyl 2-Methyl-Allyl Malonic Ester:*

When purified by fractional distillation in vacuo, 1-methyl-propyl 2-methyl-allyl malonic ester has a boiling point of 102–104° C., corrected, at about 1.5 mm. pressure. It is represented by the following formula:

(13) 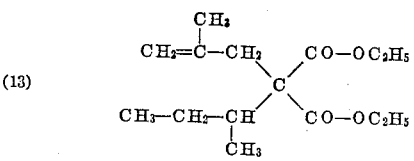

*n-Pentyl 2-Methyl-Allyl Malonic Ester:*

When purified by fractional distillation in vacuo, n-pentyl 2-methyl-allyl malonic ester has a boiling point of 112–114° C., corrected, at about 1 mm. pressure. It is represented by the following formula:

(14) 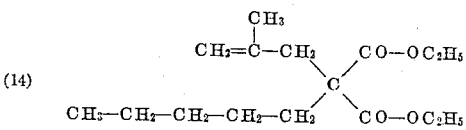

*Allyl 2-Methyl-Allyl Malonic Ester:*

When purified by fractional distillation in vacuo, allyl 2-methyl-allyl malonic ester has a boiling point of 124–127° C., corrected, at about 6 mm. pressure. It is represented by the following formula:

(15) 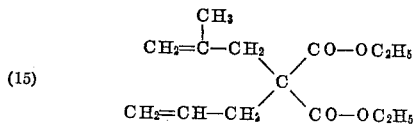

*Ethyl 2-Methyl-Allyl Malonic Ester:*

When purified by fractional distillation in vacuo, ethyl 2-methyl-allyl malonic ester has a boiling point of 122–124° C., uncorrected, at about 10 mm. pressure. It is represented by the following formula:

(16) 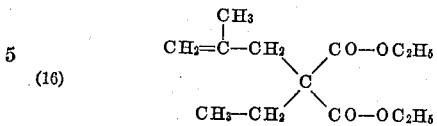

I claim as my invention:

1. An unsymmetrical di-substituted malonic ester which is represented by the following formula:

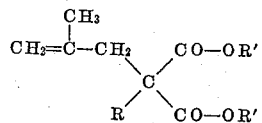

in which R represents a saturated aliphatic-hydrocarbon group which contains from 2 to 6 carbon atoms and which has a carbon atom that is directly attached to the methylene carbon of the malonic ester and that is attached to not more than two other carbon atoms, and R' represents an alkyl radical having not to exceed 3 carbon atoms, and both of the R' groups are the same.

2. An unsymmetrical di-substituted malonic ester which is represented by the following formula:

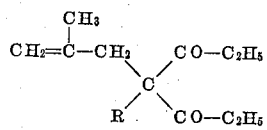

in which R represents a saturated aliphatic-hydrocarbon group which contains from 2 to 6 carbon atoms and which has a carbon atom that is directly attached to the methylene carbon of the malonic ester and that is attached to not more than two other carbon atoms.

3. An unsymmetrical di-substituted malonic ester as set forth in claim 1, in which R is a saturated lower-alkyl group.

4. An unsymmetrical di-substituted malonic ester as set forth in claim 1, in which R is a saturated straight-chain lower-aliphatic group.

5. An unsymmetrical di-substituted malonic ester as set forth in claim 1, in which R is a saturated alkyl group having five carbon atoms.

6. An unsymmetrical di-substituted malonic ester as set forth in claim 1, in which R is a saturated alkyl group having four carbon atoms.

7. n-Pentyl 2-methyl-allyl malonic ester, which is represented by the following formula:

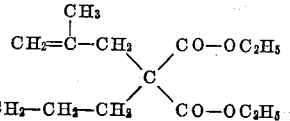

8. n-Butyl 2-methyl-allyl malonic ester, which is represented by the following formula:

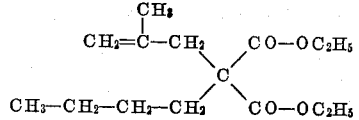

HORACE A. SHONLE.